(12) United States Patent
Benz et al.

(10) Patent No.: US 9,804,278 B2
(45) Date of Patent: Oct. 31, 2017

(54) RADIOMETRIC MEASURING DEVICE FOR CARRYING OUT MEASUREMENTS IN EXPLOSION-PRONE AREAS

(71) Applicant: Endress + Hauser GmbH + Co. KG, Maulburg (DE)

(72) Inventors: Dieter Benz, Bad Sackingen (DE); Simon Weidenbruch, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 15/103,999

(22) PCT Filed: Nov. 14, 2014

(86) PCT No.: PCT/EP2014/074642
§ 371 (c)(1),
(2) Date: Jun. 13, 2016

(87) PCT Pub. No.: WO2015/090765
PCT Pub. Date: Jun. 25, 2015

(65) Prior Publication Data
US 2016/0320498 A1    Nov. 3, 2016

(30) Foreign Application Priority Data
Dec. 20, 2013 (DE) ........................ 10 2013 114 617

(51) Int. Cl.
*G01T 1/20* (2006.01)
*G01F 23/288* (2006.01)
*G01T 1/24* (2006.01)

(52) U.S. Cl.
CPC .............. *G01T 1/2018* (2013.01); *G01T 1/24* (2013.01)

(58) Field of Classification Search
CPC .. G01F 23/284; G01F 23/288; G01F 23/2885; G01T 1/24; G01T 1/2018
See application file for complete search history.

(56) References Cited

U.S. PATENT DOCUMENTS 7,851,758 B1 * 12/2010 Scanlon .................... G01J 5/02
250/330
8,878,136 B2 * 11/2014 Weidenbruch ........ G01F 23/288
250/363.01

(Continued)

FOREIGN PATENT DOCUMENTS

DE          122865       11/1975
DE       102005055176 A1   5/2007

(Continued)

OTHER PUBLICATIONS

German Search Report, German Patent Office, Munich, DE, Aug. 11, 2014.

(Continued)

*Primary Examiner* — David Porta
*Assistant Examiner* — Faye Boosalis
(74) *Attorney, Agent, or Firm* — Bacon & Thomas, PLLC

(57) ABSTRACT

The invention relates to a radiometric measuring device for carrying out measurements in an explosion-prone area, which radiometric measuring device requires only little space at the measurement location and can be economically produced. The radiometric measuring device comprises a measuring unit (7) that can be used in the explosion-prone area. Said measuring unit comprises a scintillator (13), which converts radioactive radiation incident on the scintillator into photons, and a semiconductor detector (15), which is connected to the scintillator (13) and can be operated by means of an inherently safe energy supply and metrologically captures photons arising in the scintillator (13) and reaching the semiconductor detector (15), and converts said (Continued)

photons into electrical measurement signals. Explosion protection measures to be associated exclusively with the ignition protection class of the inherent safety are provided in the measuring unit. The radiometric measuring device also comprises a superordinate unit (11) to be arranged outside of the explosion-prone area and to be connected to the measuring unit (7). The superordinate unit effects an inherently safe supply of the measuring unit (7)—in particular, the semiconductor detector (15), during measuring operation.

5 Claims, 2 Drawing Sheets

(56) References Cited

U.S. PATENT DOCUMENTS

| | | | |
|---|---|---|---|
| 9,170,341 | B2 | 10/2015 | Howe |
| 9,354,329 | B2 | 5/2016 | Thalhammer |
| 9,450,399 | B2 * | 9/2016 | Grozinger ............... G01F 15/06 |
| 2007/0127625 | A1 | 6/2007 | Hornig |
| 2013/0322020 | A1 | 12/2013 | Mayer |

FOREIGN PATENT DOCUMENTS

| | | |
|---|---|---|
| DE | 102009002816 A1 | 11/2010 |
| DE | 102010040833 A1 | 3/2012 |
| DE | 102011004061 A1 | 8/2012 |
| DE | 102011013058 A1 | 9/2012 |
| GB | 2495197 A | 4/2013 |

OTHER PUBLICATIONS

International Search Report, EPO, The Netherlands, Feb. 3, 2015.
English Translation of the International Preliminary Report on Patentability, WIPO, Geneva, CH, Jun. 30, 2016.

* cited by examiner

RADIOMETRIC MEASURING DEVICE FOR CARRYING OUT MEASUREMENTS IN EXPLOSION-PRONE AREAS

TECHNICAL FIELD

The invention relates to a radiometric measuring device for carrying out measurements in explosion-prone areas, having a scintillator, which converts radioactive radiation incident on the scintillator into photons, and a detector, which is connected to the scintillator, which detector captures photons arising in the scintillator and reaching the detector and converts said photons into electrical measurement signals.

BACKGROUND DISCUSSION

In the area of industrial metrology, a multitude of applications exist, where radiometric measuring devices have to be operated in locations that are exposed to a risk of explosion. Filling stations and chemical plants can be mentioned here as examples, where explosive gases can form.

Devices that are usable in explosion-prone areas have to comply with very strict safety requirements. Said requirements have the objective of preventing or avoiding spark formation, which could potentially trigger an explosion, since a spark that occurs inside an enclosed space can still have an impact on the surroundings. This objective can be achieved in different ways. The respective explosion protection measures are subdivided into ignition protection classes that are regulated in the respective industry standards, as in, for example, the series of standards IEC 60079 of the International Electrotechnical Commission.

The ignition protection class that is particularly relevant for measuring devices in practice is "inherent safety (Ex-i)."

For devices designed according to the ignition protection class "inherent safety," the values for the existing electrical energy, reflected particularly in the electrical quantities of current, voltage, and power, have to be below a preset limit value inside the device at all times. The limit values are selected such that in the event of a failure, e.g., a short circuit, the maximum released energy is not sufficient to create an ignition spark or a dangerous overheating. Usually, the amount of energy is kept below the preset limit values by way of power-limiting measures, e.g., by respective combinations of current-limiting and voltage-limiting components. In addition to that, depending upon the device design, minimum safety distances or insulation measures between the individual components or circuits have to be provided.

In cases where energy cannot be limited to inherently safe values, additional ignition protection measures of other ignition protection classes have to be applied, e.g., ignition protection measures of the ignition protection class "pressurized enclosure (Ex d)," the ignition protection class "encapsulation (Ex m)," or the ignition protection class "powder filling (Ex q)." This requires relatively elaborate mechanical measures.

Detectors provided in radiometric measuring devices for detection of ionizing radiation regularly require very high operating voltages—particularly, voltages in the kilovolts range. Classical examples are Geiger-Müller counters and scintillator detectors, where gamma radiation incident on a scintillator is converted into light pulses which then are subsequently converted into electrical signals by a photomultiplier that is operated with high voltage.

In order to be able to use such measuring devices in explosion-prone areas, their components that require high voltage for operation are nowadays regularly arranged inside an encapsulation or in a pressure-tight enclosure. In addition, these components have to be sufficiently electrically insulated and positioned at a sufficiently distant location from the rest of the measuring device components, in order to prevent a potential flashover of the high voltages onto unsecured areas—particularly, onto inherently safe measuring circuits. Thus, in addition to the ignition protection class measures of "inherent safety (Ex-i)," measures of other ignition protection classes—particularly, complex encapsulations—always need to be applied.

These parallel measures to be provided are not only cost-intensive, but also require a lot of space. Thus, such measuring devices can be used only where sufficient space for the measuring device is available at the measuring location.

SUMMARY OF THE INVENTION

The invention is based upon the task of specifying a radiometric measuring device with a detector for detecting ionizing radiation, which measuring device can be used in explosion-prone areas, requires only little space at the measuring location, can be produced cost-effectively and, particularly, can be safely installed using simple means.

For this purpose, the invention comprises a radiometric measuring device for carrying out measurements in an explosion-prone area, having
  a measuring unit that is usable in explosion-prone areas, having
    a scintillator, which converts incident radioactive radiation into photons, and
    a semiconductor detector, which is connected to the scintillator and can be operated by means of an inherently safe energy supply and metrologically captures photons arising in the scintillator and reaching the semiconductor detector, and converts said photons into electrical measurement signals,
  in which measuring unit explosion protection measures to be associated exclusively with the ignition protection class of inherent safety are provided, and
  a superordinate unit to be arranged outside of the explosion-prone area and to be connected to the measuring unit,
  which superordinate unit effects an inherently safe supply of the measuring unit—in particular, the semiconductor detector—during measuring operation.
According to a preferred embodiment
  the semiconductor detector is the only electrical component provided in the measuring unit that needs to be supplied with energy during measuring operation, and
  only one explosion protection measure of the inherent safety ignition protection class is provided inside the measuring unit, which measure consists of the semiconductor detector being a semiconductor detector chip that can be supplied with energy via an inherently safe energy supply.

Another embodiment comprises a measuring device according to the invention, in which
  the semiconductor detector is a semiconductor detector chip with one or several light-sensitive cells connected in parallel,
  the light-sensitive cells are equipped with photodiodes—particularly, avalanche photodiodes operated in Geiger mode—and
  the photodiodes have low breakdown voltages of less than 30 V—particularly, less than 20 V—and the semiconductor detector can be operated with a respectively low operating voltage—particularly, an operating voltage lower than 30 V.

Another embodiment comprises a measuring device according to the invention, in which
an inherently safe additional circuit is provided between the semiconductor detector and the superordinate unit, the additional circuit is supplied with energy via the superordinate unit in an inherently safe manner, and
the additional circuit effects an inherently safe energy supply of the semiconductor detector.

An alternative embodiment comprises a measuring device according to the invention, in which
the connection of the superordinate unit to the semiconductor detector is a wireless connection,
the measuring unit is equipped with an RFID transponder that is connected to the semiconductor detector or integrated therein, and
the superordinate unit is configured as a RFID reading device, which supplies the measuring unit wirelessly with energy in an inherently safe manner.

BRIEF DESCRIPTION OF THE DRAWINGS

The invention and further advantages will now be explained in detail using the figures in the drawing, which show three examples of embodiments; the same elements in the figures are marked by the same reference numbers.

DETAILED DISCUSSION IN CONJUNCTION WITH THE DRAWINGS

Figure 1:
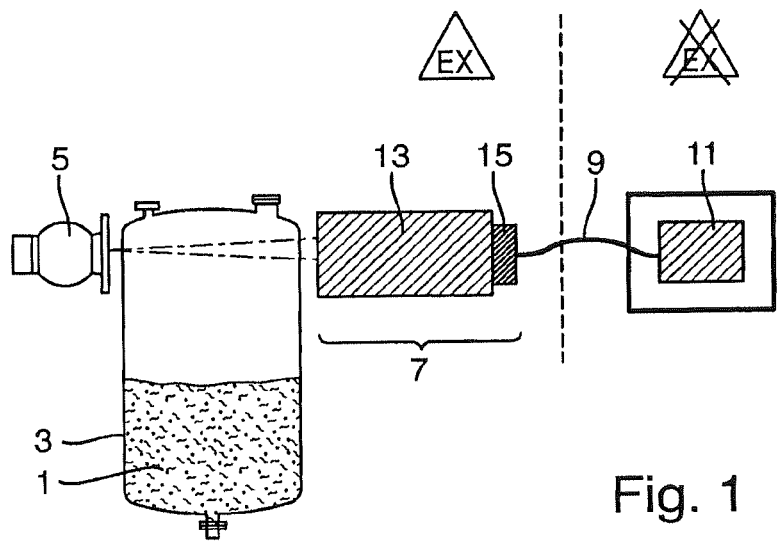
FIG. 1 shows: a radiometric measuring device according to the invention used as a limit switch.

FIG. 1 shows an application example for the use of a radiometric measuring device according to the invention. A radiometric limit switch is shown as an example of an embodiment, which limit switch monitors the filling material 1 exceeding or falling below a preset fill level in a container 3. The container 3 is positioned inside an explosion-prone area, depicted with "Ex" in FIG. 1. The shown measuring arrangement comprises a radioactive emitter 5, which is arranged on the outside of the container 3 at the height of the fill level to be monitored, which emitter is sending ionizing radiation, particularly gamma radiation, at the height of the preset fill level through the container 3. Herein, the intensity of the radiation that crosses the container 3 and emerges on the side of the container 3 which is opposite of the emitter 5 is dependent upon the absorption inside the container 3, which absorption is in turn dependent upon the fill level inside the container 3:

The measuring device comprises a measuring unit 7, which can be installed in the explosion-prone area and operated via an inherently safe energy supply, and a superordinate unit 11, which is to be connected to the measuring unit via a connection line 9 to effect the inherently safe energy supply of the measuring unit 7. The superordinate unit 11 is, for example, a measuring transducer supply unit.

The measuring unit 7 measures the radiation intensity emerging from the container 3. When the measured radiation intensity falls below a preset threshold value, the measuring unit recognizes that the preset fill level has been exceeded; when the measured radiation intensity exceeds a preset threshold value, the measuring unit recognizes that the actual fill level falls below the preset fill level.

Alternatively, with the use of a respective arrangement of emitter 5 and measuring unit 7, the radiometric measuring device according to the invention can also be used for determining other measured variables, such as a fill level of a filling material in a container or a density of a medium that the radiation passes through.

The measuring unit 7 is equipped with electrical components that individually, as well as in combination with each other, comply exclusively with the requirements of the ignition protection class of inherent safety when supplied with energy during measuring operation. That is, all provided electrical components to be supplied with energy—individually, as well as in combination with each other—do not require more current, voltage, and power than what are provided via the inherently safe energy supply.

According to the invention, the measuring unit 7 shall be provided with explosion protection measures that are exclusively compliant with the ignition protection class of inherent safety. Explosion protection measures of other ignition protection classes are not provided, and not required.

The measuring unit 7 comprises in this case a bar-shaped scintillator 13, which converts impinging ionizing radiation into photons that subsequently spread along the scintillator 13. Instead of using one massive scintillator body, individual or multiple, scintillator fibers combined into a bundle, for example, may, alternatively, also be used as scintillator 13. No electrical current or voltage is applied to the scintillator 13.

At least one semiconductor detector 15 is connected to the scintillator 13 at the end side, which semiconductor detector can be operated by means of an inherently safe energy supply and metrologically captures photons arising in the scintillator 13 and reaching the semiconductor detector 15, and converts said photons into electrical measurement signals. The semiconductor detector 15 is preferably a semiconductor detector chip.

As protection from environmental influences, a cover for enclosing the scintillator 13, e.g., a protective tube, as well as a chip surround for the semiconductor detector 15, can be provided.

The previously mentioned semiconductor detector chips are particularly suitable for an inherently safe operation. Relevant examples are components under the designation DPC6400-22-44 or the digital silicon photomultipliers under the designation DPC3200-22-44 distributed by Philips, the silicon photomultipliers distributed by Ketek under the designation PM3350, or silicon photomultipliers distributed by SensL.

The semiconductor detector 15 comprises one or several end faces facing the scintillator 13 that are equipped with one or several light-sensitive cells. The light-sensitive cells each comprise one or several photodiodes that are, for example, arranged in an array. The photodiodes are preferably avalanche photodiodes that are operated in Geiger mode and connected in parallel. The functionality of such semiconductor detectors is, for example, described in the English patent application GB 2479053 A.

In relation to the inherently safe operation of the measuring unit 7—particularly, the semiconductor detector 15—semiconductor detector chips are used, which are equipped with photodiodes that have low breakdown voltages of less than 30 V—preferably, even less than 20 V—and can therefore be operated with a respectively low operating voltage—particularly, an operating voltage lower than 30 V. The previously mentioned semiconductor detector chips of the manufacturers mentioned above are particularly suitable in this regard.

During measuring operation, the measuring unit 7 is supplied by the superordinate unit 11 in an inherently safe manner. The semiconductor detector 15 is preferably designed as a semiconductor detector chip that can be operated in an inherently safe manner. It is the only electrical component provided in the measuring unit 7 requiring a supply of electrical energy. This enables the measuring unit 7 to be restricted to inherently safe ignition protection class measures or to even completely forgo further measures associated with the ignition protection class of inherent safety, such as, for example, insulations and/or minimum distances between components supplied with electrical energy.

For illustration purposes, an example of a semiconductor detector 15 mentioned above is specified below, which is based upon the requirements of the standard IEC60079-11 for the ignition protection class Ex ia for the gas group MC and the temperature class T4, and which requires an operating voltage of 28 V, an operating current of maximum 2 mA, and a corresponding power requirement of maximum 56 mW. This semiconductor detector 15 has an internal capacitance of 3.5 nF, an internal inductance of 200 µH, and a thermal resistance of 500 K/W. It is intended for operation within a temperature range of −20° C. to +50° C.

As an example of a superordinate unit 11, a measuring transducer supply unit is provided here that complies with the requirements of the ignition protection class Ex ia IIC according to the standard IEC60079-11, which provides a maximum output voltage of 30 V, a maximum output current of 3 mA, and a maximum output power of 90 mV and allows an exterior concentrated capacitance of maximum 60 nF, and an exterior concentrated inductance of maximum 100 mH.

As connection line 9, a coaxial transmission line with a capacitance of 18 nF and an inductance of 100 µH is used.

The output voltage, output current, and output power of the superordinate unit 11 cover the supply requirements of the semiconductor detector 15.

In addition to that, the capacitance sum of the semiconductor detector 15 and the connection line 9 is lower than the permitted connectable capacitance of the superordinate unit 11, and the inductance sum of the semiconductor detector 15 and the connection line 9 is lower than the permissible connectable inductance of the superordinate unit 11.

The capacitance of the semiconductor detector 15 of 3.5 nF is distinctly lower than the maximum limit value of 66 nF, which would apply for the existing voltage values in accordance with the standard IEC60079-11.

Likewise, the inductance of the semiconductor detector 15 of 1 µH is distinctly lower than the maximum limit value of 1 mH, which would apply for the existing current values in accordance with the standard IEC60079-11.

In the event of a failure, in which the entire maximum available power of 90 mW in the semiconductor detector 15 would be converted into heat via its thermal resistance according to the previously mentioned conversion factor of 500 K/W, the temperature would rise by 45° C. Thus, the temperature inside the semiconductor detector 15 would still fall below the limit value of 130° C., which is required by the temperature class 4, if the semiconductor 15 was being operated at a temperature of +50° C., which would correspond to the maximum temperature limit, and its temperature would rise from this value by 45° C. due to a conversion of its entire power.

This shows that the measuring unit 7 can be used in explosion-prone areas without requiring further measures of other ignition protection classes in addition to the measures associated with the ignition protection class of inherent safety. For this reason, the measuring unit 7 can be manufactured in a very compact and cost-effective way. In addition to that, it can be installed very easily and safely.

Generally, two or more semiconductor detectors 15 can also be connected to the superordinate unit 11 parallel to each other via respective connection lines 9 and be supplied with energy via the superordinate unit 11. Since the inherent safety is ensured via one single inherently safe supply by the superordinate unit 11, no additional explosion protection measures are required in such a case. Only the rules for inherent safety design according to IEC60079-11 have to be complied with.

Figure 2:
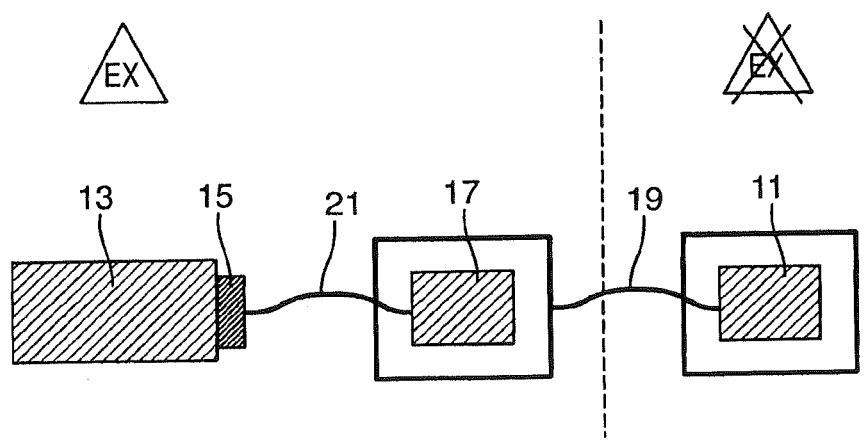
FIG. 2 shows: a radiometric measuring device with a measuring unit, which is supplied via an additional circuit.

FIG. 2 shows an alternative exemplary embodiment of a radiometric measuring device according to the invention. Given the extensive correspondence to the exemplary embodiment depicted in FIG. 1, only the existing differences will be explained in the following. Apart from that, the description of FIG. 1 is referred to.

Unlike the exemplary embodiment shown in FIG. 1, here, the supply of the semiconductor detector 15 is carried out via an inherently safe additional circuit 17 that is arranged between the semiconductor detector 15 and the superordinate unit 11. In connection with the example described in detail above, an additional circuit 17, designed according to the ignition protection class Ex ia IIC T4, is particularly suitable. The additional circuit 17 is connected to the superordinate unit 11 via a connection line 19, e.g., a two-core installation cable, via which it is supplied in an inherently safe manner. Furthermore, it is connected to the semiconductor detector 15 via a connection line 21, e.g., a coaxial transmission line, and affects the inherently safe supply of said detector. In this embodiment, the maximum input values on the side of the semiconductor detector 15 are provided by the maximum output voltage, the maximum output current, and the maximum output power of the additional circuit 17. These are identical in amount to the previously specified values for the directly supplying superordinate unit 11.

The additional circuit 17 can be operated in an explosion-prone area just like the semiconductor detector 15. In addition to measures corresponding to the ignition protection class of inherent safety, no further measures of other ignition protection classes are required here as well.

Figure 3:
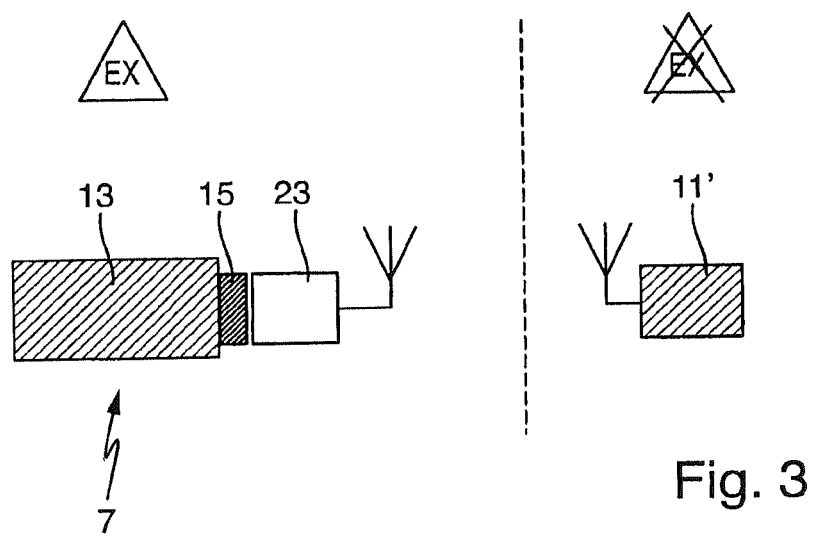
FIG. 3 shows: a radiometric measuring device with a measuring unit that is equipped with a RFID transponder.

FIG. 3 shows an additional embodiment of a measuring device according to the invention. It differs from the exemplary embodiment shown in FIGS. 1 and 2 in that the supply of the measuring unit 7 is achieved in a wireless manner, and the semiconductor detector 15 requires far less operating power. For this reason, the measuring unit 7 is equipped with an RFID transponder 23 that is connected to the semiconductor detector 15 or integrated therein. The superordinate unit 11' here is configured as an RFID reading device, by which the measuring unit 7 is supplied with power in a wireless and inherently safe manner and the measuring results of the measuring unit 7 are read. The supply energy provided by the RFID reading device to the semiconductor detector 15 is here also of such a low value that the ignition protection class, "inherent safety," is maintained. Also, in this embodiment, no further measures of other ignition protection classes in addition to the ignition protection class of inherent safety are required in the measuring unit 7.

Although the invention is described here in relation to the explosion protection standards of the International Electrotechnical Commission, the use of the measuring device according to the invention is not limited to the scope of these standards. Identical or similar regulations apply also in other national standards and norms of inherent safety, so that the invention can also be used in the respective countries.

1 Filling material
3 Container
5 Radioactive emitter
7 Measuring unit
9 Connecting line
11 Superordinate unit
11' Superordinate unit
13 Scintillator
15 Semiconductor detector chip
17 Additional circuit
19 Connecting line
21 Connecting line
23 RFID Transponder

The invention claimed is:

1. The radiometric measuring device for carrying out measurements in an explosion-prone area, comprising:
    a measuring unit that is usable in explosion-prone areas, having a scintillator, which converts incident radioactive radiation into photons, and a semiconductor detector, which is connected to said scintillator and can be operated by means of an inherently safe energy supply and metrologically captures photons arising in said scintillator and reaching said semiconductor detector, and converts said photons into electrical measurement signals, in which measuring unit explosion protection measures to be associated exclusively with an ignition protection class of inherent safety are provided; and
    a superordinate unit to be arranged outside of the explosion-prone area and to be connected to said measuring unit, wherein:
    said superordinate unit effects an inherently safe supply of said measuring unit—in particular, said semiconductor detector, during measuring operation.

2. The radiometric measuring device according to claim 1, wherein:
    said semiconductor detector is the only electrical component provided in said measuring unit that needs to be supplied with energy during measuring operation; and
    only one explosion protection measure of the inherent safety ignition protection class is provided inside said measuring unit, which measure consists of said semiconductor detector being a semiconductor detector chip that can be supplied with energy via an inherently safe energy supply.

3. The radiometric measuring device according to claim 1, wherein:
    said semiconductor detector is a semiconductor detector chip with one or several light-sensitive cells connected in parallel;
    said light-sensitive cells are equipped with photodiodes—particularly, avalanche photodiodes operated in Geiger mode;
    said photodiodes have low breakdown voltages of less than 30 V—particularly, less than 20 V; and
    said semiconductor detector can be operated with a respectively low operating voltage—particularly, an operating voltage lower than 30 V.

4. The radiometric measuring device according to claim 1, further comprising:
    an inherently safe additional circuit between said semiconductor detector and said superordinate unit;
    said additional circuit is supplied with energy via said superordinate unit in an inherently safe manner; and
    said additional circuit effects an inherently safe energy supply of said semiconductor detector.

5. The radiometric measuring device according to claim 1, wherein:
    the connection of said superordinate unit to said semiconductor detector is a wireless connection;
    said measuring unit is equipped with an RFID transponder that is connected to said semiconductor detector or integrated therein; and
    said superordinate unit is configured as an RFID reading device, which supplies said measuring unit wirelessly with energy in an inherently safe manner.

* * * * *